CIRCUIT FOR PRODUCING OUTPUT PULSES THAT PROGRESSIVELY INCREASE OR DECREASE IN DELAY TIME WITH RESPECT TO INPUT PULSES
Filed Nov. 15, 1967
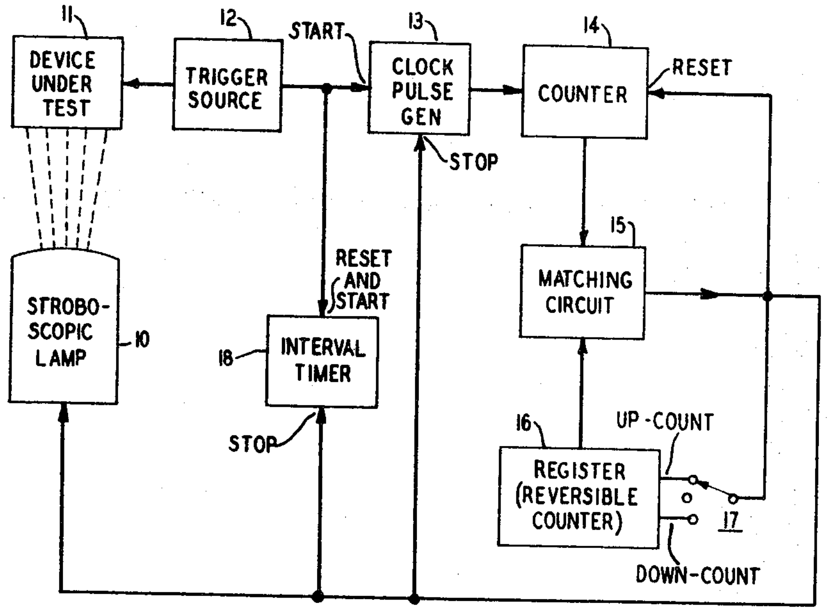
INVENTORS R.L. BESEMER
H. WINTER
BY [signature]
ATTORNEY United States Patent Office 3,534,269
Patented Oct. 13, 1970

3,534,269
CIRCUIT FOR PRODUCING OUTPUT PULSES THAT PROGRESSIVELY INCREASE OR DECREASE IN DELAY TIME WITH RESPECT TO INPUT PULSES

Richard L. Besemer, Pickerington, and Harry Winter, Granville, Ohio, assignors to Bell Telephone Laboratories, Incorporated, Murray Hill, N.J., a corporation of New York Filed Nov. 15, 1967, Ser. No. 683,325
Int. Cl. H03k 21/32
U.S. Cl. 328—48 4 Claims

ABSTRACT OF THE DISCLOSURE

An input pulse starts a clock source whose output is counted in a counter. When the counter output equals a count in a register, an output pulse is produced. At the same time, the clock source is stopped, the counter is reset and the count in the register is either inncreased or decreased by one. Successive input pulses therefore produce output pulses which progressively increase or decrease in delay time with respect to their input pulses.

BACKGROUND OF THE INVENTION

Field of the invention

This invention relates to circuits responsive to input pulses to produce output pulses which occur at either progressively increasing or decreasing delay times with respect to their input pulses.

Description of the prior art

Circuits of the above defined type are required in several fields including the test equipment field. Such a circuit may be used, for example, in a sampling oscilloscope—that is, an oscilloscope that samples a repetitive electrical phenonomenon at a slightly later time each successive cycle to display what appears to be one cycle of the phenomenon. It may also be used in conjunction with a stroboscope so that a repetitive mechanical action may be studied "in slow motion."

Several problems may exist when using such circuits. For example, linearity of the changes in delay times necessary for successful results may not be attainable. Furthermore, it may be impossible to control changes in delay times so that a particular portion of the phenomenon under study may be studied in detail. It obviously would be desirable to reduce or eliminate these and other similar problems.

SUMMARY OF THE INVENTION

An object of the invention is to improve the linearity of progressively increasing or decreasing delay times between respective input and output pulses.

Another object is to be able to control the change in delay times so that the output pulses are produced at a selected delay time following their input pulses.

These and other objects are achieved in accordance with the invention by starting a clock source in response to each input pulse. The clock source output is counted in a counter until the counter output equals a count stored in a register. When this equality occurs, the clock source is stopped, the counter is reset and the register count is changed by one. At the same time, an output pulse is produced. These output pulses are progressively delayed with respect to their input pulses when the register count is increased with each change. Conversely, the output pulses are progressively advanced with respect to their input pulses when the register count is decreased with each change. On the other hand, the output pulses are repetitively produced at a selected delay time by blocking changes to the register count.

Other objects and features of the invention will become apparent from a study of the following detailed description of a specific embodiment shown in use with a stroboscopic lamp.

BRIEF DESCRIPTION OF THE DRAWING

The drawing shows a block diagram of an embodiment of the invention used in a test setup.

DESCRIPTION OF THE DISCLOSED EMBODIMENT

The embodiment is shown in the drawing in use with a stroboscopic lamp 10. A device under test is identified by the symbol 11 and may comprise, for example, a relay which is repetitively operated and released in a conventional manner in response to the output from a trigger source 12. In operation, the lamp momentarily but repetitively illuminates the device. The use of such a lamp in this manner to either "stop" or "slow down" the operation of a device is well known to those skilled in the art.

The remainder of the circuitry compriss the embodiment of the invention. The manner in which it controls the firing of lamp 10 is now presented.

The output from trigger source 12 also triggers a clock pulse generator 13. The output of generator 13 is counted in a counter 14 with the output of the counter being applied to a matching circuit 15. A register 16 (which in this embodiment comprises a reversible counter) also applies its output to matching circuit 15. When the output of counter 14 matches the output of register 16, an output is produced by matching circuit 15. The delay time between the start input to clock pulse generator 13 and the occurrence of the matching circuit output is dependent on the repetition rate of generator 13 and the count in register 16. As the repetition rate is relatively constant, delay time is changed in discrete steps in proportion to changes in the count of register 16.

The output from matching circuit 15 is applied to a number of inputs. First, it resets counter 14 and, depending on the position of a switch 17, it may either add to or subtract from the count in register 16. The output is also applied to stop inputs of generator 13 and an interval timer 18. Finally, the output fires lamp 10.

In operation, the position of switch 17 determines whether lamp 10 fires later, earlier or at the same time on successive cycles of operation of device 10. For example, when switch 17 applies the output of matching circuit 15 to the up-count terminal of register 16, delay times between start inputs and matching circuit outputs increase as a function of time. In particular, assume register 16 to be set at its minimum count which is the count of one. The first pulse from generator 13 in response to a start input causes a one count to appear in the output of counter 14. At that time, matching circuit 15 produces an output which resets counter 14, increases the count by one in register 16, stops timer 18 and generator 13 and fires lamp 10. When the next start input is applied to generator 13, the generator produces two pulses in its output before matching circuit 15 produces an output and lamp 10 is fired. With each cycle of operation started by start inputs to generator 13, a one is added to the register count until the register has reached its maximum count. At this time, it resets to the count of one and the above described process repeats itself.

From the above description of the operation of the embodiment when switch 17 is connected to the up-count input of register 16, it is believed apparent that subsequent delay times increase by one pulse period of generator 13. The courseness with which the delay times increase is therefore a function of the repetition rate of generator 13. The maximum delay time, on the other hand, is a function of the repetition rate and the maximum count for register 16.

When switch 17 is connected to the down-count input of register 16, subsequent start inputs reduce the count in the register so that subsequent delay times decrease by one pulse period of generator 13. This mode of operation permits the actions of device 11 to be studied in "reverse slow motion."

When switch 17 is in its center position, the delay time remains fixed for subsequent start inputs. The actual delay time is of course determined by the repetition rate of generator 13 and the count in register 16. For a fixed generator repetition rate, the delay time may be readily set to another value by operating switch 17 so as to change the count in register 16. The action of device 11 at any point in its operating cycle may thus be studied in detail. Furthermore, under this mode of operation, timer 18 produces the same time indication for each cycle. This indication therefore appears constant and informs the tester as to the time of occurrence of the part of the cycle being studied.

While the invention has been described in a particular test setup, it is to be understood that this is meant as an example and not as a limitation. In particular, various other configurations and uses may be devised by those skilled in the art without departing from the spirit and scope of the invention.

What is claimed is:

1. A combination comprising
a generator which when enabled produces clock pulses,
a counter connected to said generator to count the pulses produced by said generator,
register means for storing a count,
matching means connected between said counter and register means to produce an output each time the count in said counter matches the count in said register means,
means to apply said matching means outputs to said generator to disable said generator and to said counter to reset said counter,
means to apply said matching means outputs to said register to automatically change by one the count in said register, and
an output terminal connected to receive said matching means outputs.

2. A combination in accordance with claim 1 in which
said register means comprises a reversible counter having a minimum registerable count at least one greater than the minimum count registerable by the first mentioned counter and, furthermore, having up-count and down-count input terminals, and
said last means comprises a switch to selectively apply said outputs to said up-count and down-count input terminals.

3. A circuit that produces outputs which progressively change in delay time with respect to inputs, said circuit comprising
a generator responsive to said inputs and outputs to produce clock pulses during the time intervals between said inputs and outputs,
a counter connected to said generator,
a register for storing a count,
matching means connected between said counter and said register to produce an output comprising one of said outputs each time the counts in said counter and register are equal to one another, and
means to apply said outputs to said register and said counter to automatically change by one the count in said register and to reset said counter in response to each of said outputs.

4. A circuit in accordance with claim 3 in which
said register comprises a reversible counter having a minimum registerable count at least one greater than the minimum count registerable by the first mentioned counter and, furthermore, having up-count and down-count input terminals, and
said last means includes a switch to selectively apply said outputs to said up-count and down-count input terminals.

References Cited

UNITED STATES PATENTS

| | | | |
|---|---|---|---|
| 2,754,059 | 7/1956 | Wilcox | 328—44 X |
| 3,096,483 | 7/1963 | Ransom | 328—48 |
| 3,424,986 | 1/1969 | Vasseur | 328—48 |
| 3,431,499 | 3/1969 | Godfrey | 328—48 |

JOHN S. HEYMAN, Primary Examiner

U.S. Cl. X.R.

328—44, 129